(12) United States Patent
Meyers et al.

(10) Patent No.: US 7,135,247 B2
(45) Date of Patent: Nov. 14, 2006

(54) EASILY ISOLATED, OVERSIZED FUEL CELL STACK COOLER PLATES

(75) Inventors: Jeremy P. Meyers, West Hartford, CT (US); Nileshkumar T. Dave, West Hartford, CT (US); Jeffrey G. Lake, Vernon, CT (US); Mark W. Layaw, Vernon, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 357 days.

(21) Appl. No.: 10/691,793

(22) Filed: Oct. 23, 2003

(65) Prior Publication Data

US 2005/0089736 A1    Apr. 28, 2005

(51) Int. Cl.
*H01M 2/08* (2006.01)
*H01M 8/04* (2006.01)
*H01M 2/14* (2006.01)

(52) U.S. Cl. ............................. 429/35; 429/26; 429/38
(58) Field of Classification Search ................. 429/35, 429/26, 38
See application file for complete search history.

(56) References Cited

U.S. PATENT DOCUMENTS

| 4,508,793 | A | * | 4/1985 | Kumata et al. ................ 429/26 |
| 5,228,255 | A | * | 7/1993 | Hahn ....................... 52/396.04 |
| 6,461,753 | B1 | * | 10/2002 | Breault et al. ................ 429/26 |
| 6,916,571 | B1 | | 7/2005 | Grasso et al. |

\* cited by examiner

*Primary Examiner*—Patrick Joseph Ryan
*Assistant Examiner*—Thomas H. Parsons
(74) *Attorney, Agent, or Firm*—M. P. Williams

(57) ABSTRACT

A plurality of cooler plates (9) are disposed between fuel cells (8) in a stack (7) and have protrusions (12, 13) which include coolant inlet and outlet channels (15). The protrusions are surrounded by an elastomeric sealant material (35, 36) which forms a seal with the manifold structures (27, 28) to form coolant inlet and outlet manifolds (17, 20). The sealant material prevents coolant from entering fuel cells along the edges thereof, thereby preventing the fuel cells from being poisoned by the coolant. The coolant inlet and outlet manifold structures (27, 28) also define reactant gas manifolds (18, 21).

7 Claims, 3 Drawing Sheets

EASILY ISOLATED, OVERSIZED FUEL CELL STACK COOLER PLATES

TECHNICAL FIELD

This invention relates to cooler plates for fuel cell power plants, having extensions that allow sealing the edges of all of the cells in the stack against any possible leakage of fluids, particularly the coolant fluid, into the fuel cells themselves.

BACKGROUND ART

The use of fuel cell power plants to provide electric power to electric vehicles is being proposed by many sources. In many parts of the world, the fuel cell power plant must be able to withstand freezing temperatures. One approach is for such fuel cells to utilize a freeze-proof coolant solution, such as the common ethylene glycol antifreeze solution in water. However, ethylene glycol has a very high tendency toward poisoning the membrane of a PEM fuel cell as well as the catalyst, and must therefore be completely isolated from the fuel cells.

Cooler plates are easily provided which will totally contain the coolant within them, thereby posing no threat to the fuel cells from the coolant solution. However, a problem heretofore has been that getting the coolant into the cooler plates has required that there be a manifold which in turn may subject the joints between adjacent fuel cells, as well as the joints between cooler plates and fuel cells, to leakage of the coolant, which thereby can enter and poison the fuel cells themselves.

DISCLOSURE OF INVENTION

Objects of the invention include: improved distribution of coolant, which is harmful to fuel cells; improved coolant manifold for delivering coolant to fuel cell stack cooler plates; improved manifold structures for fuel cell reactants and coolant; and a coolant manifold which is completely sealed and therefore isolated from the fuel cells within a fuel cell stack.

According to the present invention, each cooler plate has a protrusion extending outwardly from the edges of the cooler plate that are otherwise coaligned with the edges of the fuel cells, having inlet and outlet flow channels which extend outwardly relative to the plan form of the fuel cells. By extending beyond the fuel cell edges, the cooler plate inlet and outlet passages may communicate with coolant inlet and outlet manifolds, while at the same time the inlet and outlet channels may be sealed to totally block the intrusion of coolant into the fuel cell edges.

In accordance with the invention, a manifold for antifreeze coolant is provided by a manifold structure that also defines a reactant gas manifold.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 1:
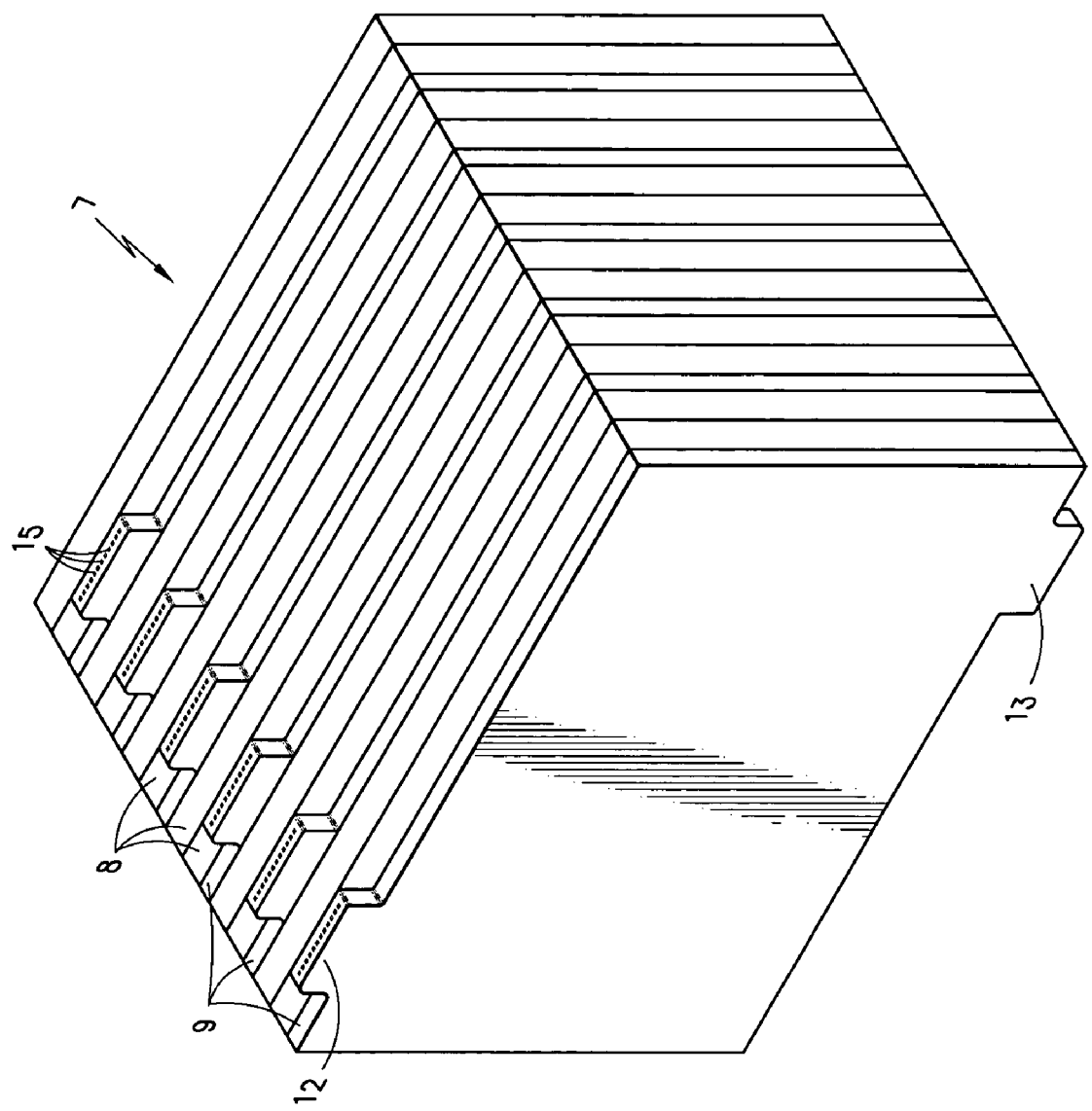
FIG. 1 is a perspective view of a several cell, fuel cell stack having cooler plates with inlet and outlet passage extensions in accordance with the invention.

Referring to FIG. 1, a section of a fuel cell stack 7 having 12 fuel cells 8, with cooler plates 9 of the present invention disposed between every other fuel cell 8. That is, there is one cooler plate 9 for each pair of fuel cells 8. Each of the cooler plates 9 has a portion 12 that extends beyond the general plane of the edges of the Fuel cell (12, 13) which contain inlet and outlet channels 15, which, for example, may comprise inlet channels within the protrusion 12 and outlet channels within the protrusion 13 (or vice versa), with coolant flow channels extending therebetween.

Figure 2:
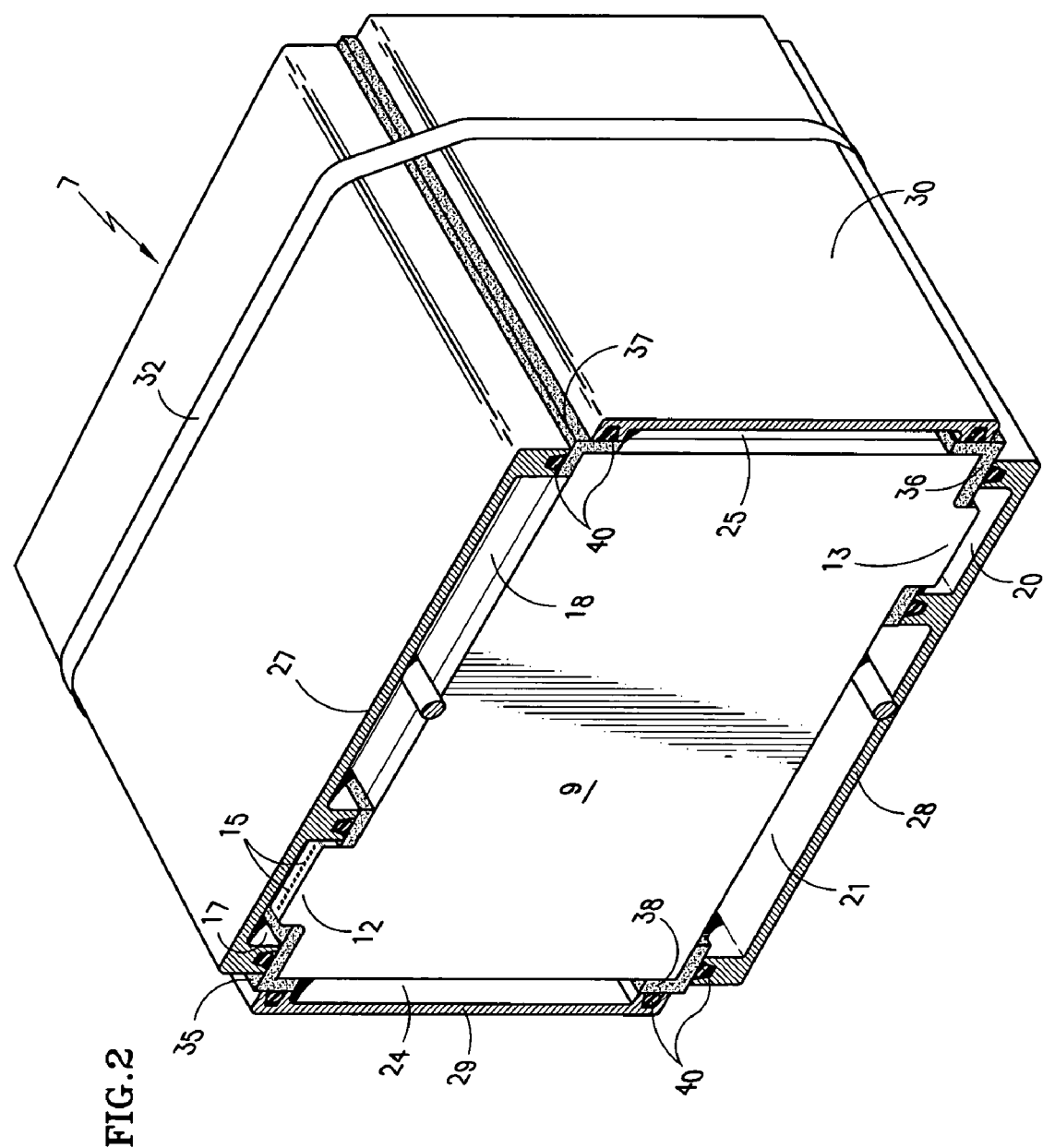
FIG. 2 is a partially sectioned, perspective view of the fuel cell stack of FIG. 1 with the various reactant gas manifolds, including coolant manifold portions, in place on the fuel cell stack.

Referring to FIG. 2, a coolant inlet manifold 17 is combined in a structure with a reactant gas manifold 18 and a coolant outlet manifold 20 is combined with another reactant gas manifold 21. Typically, the manifolds 18 and 21 are the air inlet/outlet manifold and the air turnaround manifold. Similar manifolds 24, 25 may comprise a fuel gas inlet/outlet manifold and a fuel gas turnaround manifold. The manifolds are formed by manifold structures 27–30 which are held tightly to the fuel cell stack 7 by means of a band 32 or other peripheral containment, all as is known and forms no part of the present invention.

Figure 3:
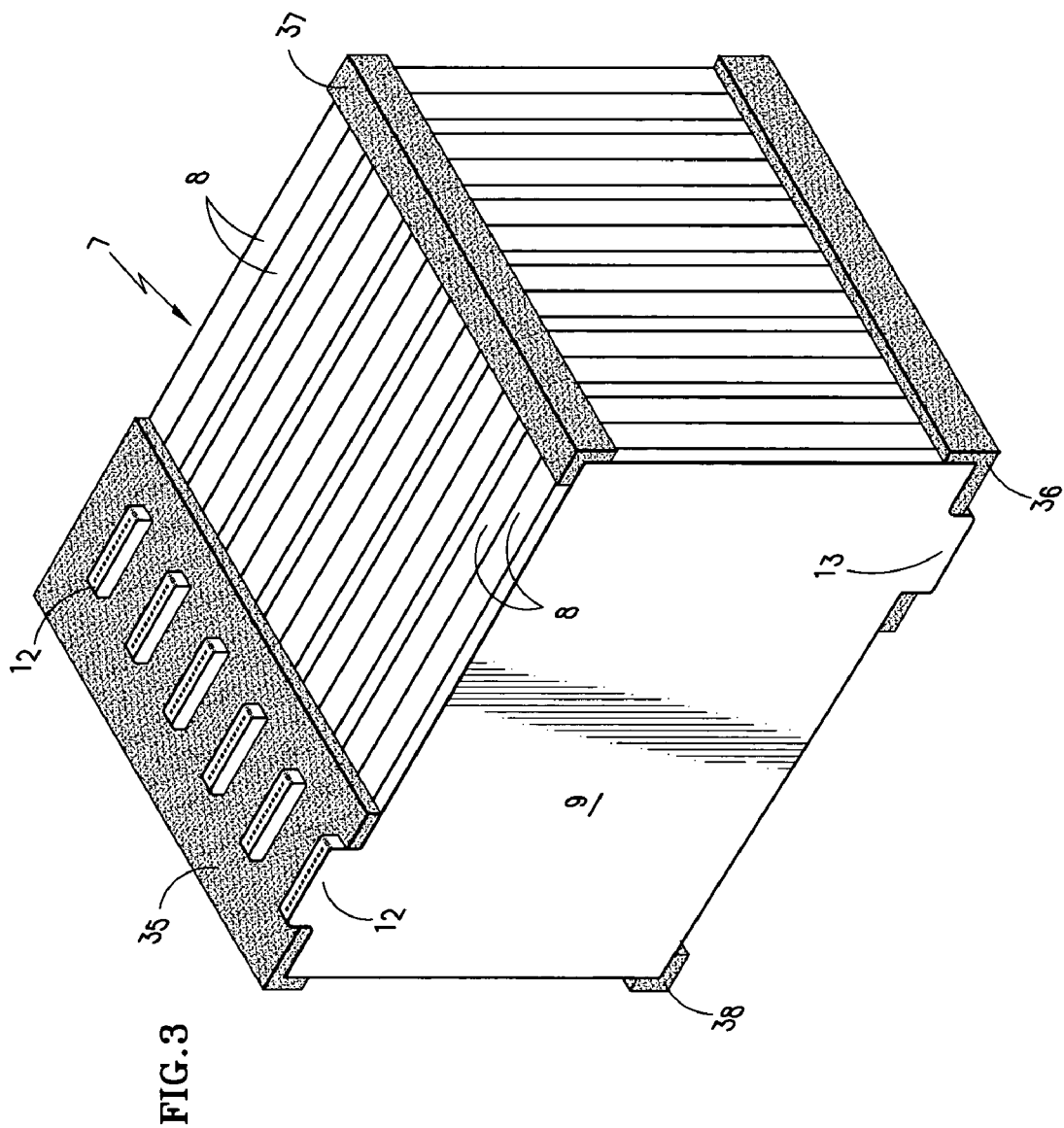
FIG. 3 is a partially sectioned, perspective view of the fuel cell stack of FIGS. 1 and 2, before manifolds are in place, with sealant material applied to the fuel cell stack, both in the area of the coolant inlet and outlet flow channels and in the corner areas of the stack, whereby the various manifolds can be sealed to the fuel cell stack.

The manifold structures 27–30 contact sealant material 35–38 which may be any plastic or elastomeric material, such as a silicone rubber that is compatible with the environment of the PEM cell. The sealant material 35, 36, shown more clearly in FIG. 3. covers the corner edges of the fuel cell stack 7 and also extends between and around all of the protrusions 12, 13, as shown in FIG. 3, so that when the manifold structures 27, 28 are held tightly against the fuel cell stack 17, the coolant manifolds 17, 20 will be totally sealed from the fuel cells 8 by the sealant material 35, 36.

The contact surfaces of the manifold structures 27–30 may have notches therein containing foam rubber gaskets 40 to make a better seal. In addition, flat strips (not shown) may be utilized to improve the seal as is disclosed in copending U.S. patent application Ser. No. 10/619,406 filed Jul. 15, 2003. The exact manner of sealing the manifold structures 27–30 to the fuel cell stack 7 is not important to the invention: the invention is that there are protrusions 12, 13 in the cooler plates and that the silicone rubber seals 35, 36 completely surround those protrusions, thereby isolating the fuel cells themselves from the coolant within the coolant manifold 17, 20.

In some embodiments, the coolant inlet and outlet manifolds may be formed by the same manifold structure, or may be formed on the same side of the fuel cell stack.

The aforementioned patent application is incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A fuel cell power plant comprising:
   a plurality of fuel cells arranged contiguously in a stack, each of said fuel cells having dimensions in width and height which are substantially equal to the width and height dimensions of the other fuel cells in said stack, whereby the edges of said fuel cells combine to form substantially planar surfaces;
   a plurality of cooler plates, each having cooler inlet channels and cooler outlet channels and cooler flow channels extending between said inlet channels and said outlet channels, said cooler plates being disposed between at least some of said fuel cells, said cooler plates having principal width and height dimensions substantially the same as those of said fuel cells, each cooler plate having a protrusion containing said cooler inlet channels and a protrusion containing said cooler outlet channels, said protrusions extending outwardly from one or more edges of said cooler plates, thereby extending away from one or more of said planar surfaces;
   an elastomeric rubber sealant material directly contacting said one or more planar surfaces, completely surrounding each of said protrusions, and extending between each one of said protrusions and a protrusion adjacent to said one protrusion, said elastomeric sealant material extending on either side of all of said protrusions and extending around said one or more planar surfaces sufficiently to form a sealing surface; and
   at least one manifold structure contacting said sealant material and defining coolant manifolds, said at least one manifold structure defining between itself and said sealant material (a) a coolant inlet manifold in fluid communication with said inlet channels or (b) a coolant outlet manifold in fluid communication with said outlet manifold channels, and also defining between itself and said sealant material (c) a reactant gas inlet manifold or (d) a reactant gas outlet manifold.

2. A fuel cell power plant according to claim 1 wherein: said elastomeric sealant material is a silicone rubber.

3. A fuel cell power plant comprising:
   a plurality of fuel cells arranged contiguously in a stack, each of said fuel cells having dimensions in width and height which are substantially equal to the width and height dimensions of the other fuel cells in said stack, whereby the edges of said fuel cells combine to form substantially planar surfaces;
   a plurality of cooler plates, each having cooler inlet channels and cooler outlet channels and cooler flow channels extending between said inlet channels and said outlet channels, said cooler plates being disposed between at least some of said fuel cells, said cooler plates having principal width and height dimensions substantially the same as those of said fuel cells, each cooler plate having a protrusion containing said cooler inlet channels and a protrusion containing said cooler outlet channels, said protrusions extending outwardly from one or more edges of said cooler plates, thereby extending away from one or more of said planar surfaces;
   an elastomeric sealant material directly contacting said one or more planar surfaces, completely surrounding each of said protrusions, and extending between each one of said protrusions and a protrusion adjacent to said one protrusion, said elastomeric sealant material extending on either side of all of said protrusions sufficiently to form a sealing surface; and
   at least one manifold structure contacting said sealant material and defining coolant manifolds, said at least one manifold structure defining between itself and said sealant material (a) a coolant inlet manifold in fluid communication with said inlet channels or (b) a coolant outlet manifold in fluid communication with said outlet channels.

4. A fuel cell power plant according to claim 3 wherein: said elastomeric sealant material is a silicone rubber.

5. A fuel cell power plant according to claim 3 wherein said manifold structure also defines between itself and said sealant material a reactant gas inlet or outlet manifold.

6. A fuel cell power plant according to claim 3 wherein:
   the protrusions of each of said cooler plates containing said coolant inlet channels are disposed on an edge of each cooler plate which is opposite to an edge of each cooler plate from which the protrusion containing said outlet channels extend.

7. A fuel cell power plant comprising:
   a fuel cell stack;
   a sealant surface directly contacting said fuel call stack;
   a manifold structure secured to said sealant surface and forming with said sealant surface either (a) a coolant inlet manifold or (b) a coolant outlet manifold, and also forming with said sealant surface either (c) a reactant gas inlet manifold or (d) a reactant gas outlet manifold.

* * * * *